United States Patent [19]

Devillier et al.

[11] Patent Number: 5,560,189

[45] Date of Patent: Oct. 1, 1996

[54] EDGING AND TRIMMING LAWN MOWER ASSEMBLY

[76] Inventors: Justin P. Devillier; Gwen H. Payne, both of 16002 Crepe Myrtle Dr., Baton Rouge, La. 70817

[21] Appl. No.: 443,763

[22] Filed: May 18, 1995

[51] Int. Cl.$^6$ .............................. A01D 34/68; A01D 34/84
[52] U.S. Cl. .................. 56/13.6; 56/16.9; 172/14
[58] Field of Search ..................... 56/13.6, 13.7, 56/16.9, 11.6, DIG. 9, 12.1, 12.7; 172/14, 15

[56] References Cited

U.S. PATENT DOCUMENTS

| | | | |
|---|---|---|---|
| 4,170,099 | 10/1979 | Owens | 56/16.9 |
| 4,453,372 | 6/1984 | Remer | 56/16.9 X |
| 4,642,976 | 2/1987 | Owens | 56/16.9 |
| 4,896,488 | 1/1990 | Duncan et al. | 56/16.9 X |

Primary Examiner—Terry Lee Melius

[57] ABSTRACT

A mower assembly for cutting, trimming, and edging a lawn. The inventive device includes a mower assembly having a blade rotating within a horizontal plane for cutting grass. A trimmer assembly extends laterally of the mower assembly for trimming grass. An edger assembly similarly projects laterally of the mower assembly and includes an edging blade rotating in a vertical plane for cutting grass adjacent a solid object.

7 Claims, 4 Drawing Sheets

5,560,189

EDGING AND TRIMMING LAWN MOWER ASSEMBLY

BACKGROUND OF THE INVENTION

1. Field of the Invention

The present invention relates to lawn cutting devices and more particularly pertains to an edging and trimming lawn mower assembly for cutting, trimming, and edging a lawn.

2. Description of the Prior Art

The use of lawn cutting devices is known in the prior art. More specifically, lawn cutting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art lawn cutting devices include U.S. Pat. No. 5,309,701; U.S. Pat. No. 4,965,990; U.S. Pat. No. 4,182,100; U.S. Pat. No. 3,871,160; and U.S. Pat. No. 3,690,384.

While these devices fulfill their respective, particular objectives and requirements, the aforementioned patents do not disclose an edging and trimming lawn mower assembly for cutting, trimming, and edging a lawn which includes a mower assembly having a blade rotating within a horizontal plane for cutting grass, a trimmer assembly extending laterally of the mower assembly for trimming grass, and an edger assembly projecting laterally of the mower assembly and including an edging blade rotating in a vertical plane for cutting grass adjacent to a solid object.

In these respects, the edging and trimming lawn mower assembly according to the present invention substantially departs from the conventional concepts and designs of the prior art, and in so doing provides an apparatus primarily developed for the purpose of cutting, trimming, and edging a lawn.

SUMMARY OF THE INVENTION

In view of the foregoing disadvantages inherent in the known types of lawn cutting devices now present in the prior art, the present invention provides a new edging and trimming lawn mower assembly construction wherein the same can be utilized for cutting, trimming, and edging a lawn. As such, the general purpose of the present invention, which will be described subsequently in greater detail, is to provide a new edging and trimming lawn mower assembly apparatus and method which has many of the advantages of the lawn cutting devices mentioned heretofore and many novel features that result in a edging and trimming lawn mower assembly which is not anticipated, rendered obvious, suggested, or even implied by any of the prior art lawn cutting devices, either alone or in any combination thereof.

To attain this, the present invention generally comprises a mower assembly for cutting, trimming, and edging a lawn. The inventive device includes a mower assembly having a blade rotating within a horizontal plane for cutting grass. A trimmer assembly extends laterally of the mower assembly for trimming grass. An edger assembly similarly projects laterally of the mower assembly and includes an edging blade rotating in a vertical plane for cutting grass adjacent a solid object.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new edging and trimming lawn mower assembly apparatus and method which has many of the advantages of the lawn cutting devices mentioned heretofore and many novel features that result in a edging and trimming lawn mower assembly which is not anticipated, rendered obvious, suggested, or even implied by any of the prior art lawn cutting devices, either alone or in any combination thereof.

It is another object of the present invention to provide a new edging and trimming lawn mower assembly which may be easily and efficiently manufactured and marketed.

It is a further object of the present invention to provide a new edging and trimming lawn mower assembly which is of a durable and reliable construction.

An even further object of the present invention is to provide a new edging and trimming lawn mower assembly which is susceptible of a low cost of manufacture with regard to both materials and labor, and which accordingly is then susceptible of low prices of sale to the consuming public, thereby making such edging and trimming lawn mower assemblies economically available to the buying public.

Still yet another object of the present invention is to provide a new edging and trimming lawn mower assembly which provides in the apparatuses and methods of the prior art some of the advantages thereof, while simultaneously overcoming some of the disadvantages normally associated therewith.

Still another object of the present invention is to provide a new edging and trimming lawn mower assembly for cutting, trimming, and edging a lawn.

Yet another object of the present invention is to provide a new edging and trimming lawn mower assembly which includes a mower assembly having a blade rotating within a horizontal plane for cutting grass, a trimmer assembly extending laterally of the mower assembly for trimming grass, and a edger assembly projecting laterally of the mower assembly and including an edging blade rotating in a vertical plane for cutting grass adjacent to a solid object.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
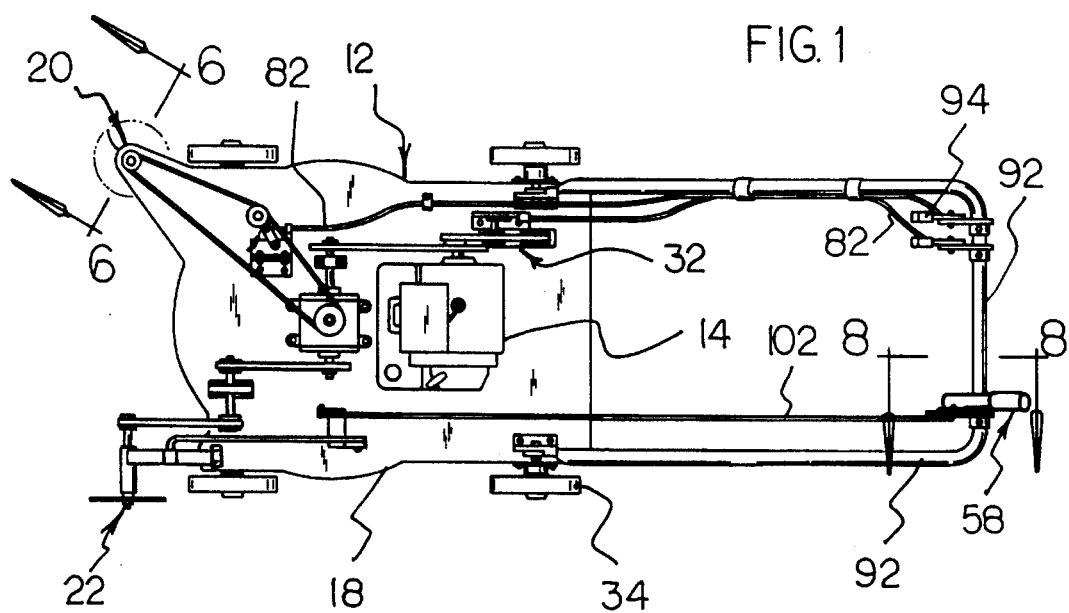
Fig. 1 is a top plan view of an edging and trimming lawn mower assembly according to the present invention.

With reference now to the drawings, and in particular to FIGS. 1–8 thereof, a new edging and trimming lawn mower assembly embodying the principles and concepts of the present invention and generally designated by the reference numeral 10 will be described.

More specifically, it will be noted that the edging and trimming lawn mower assembly 10 comprises a mower means 12 having an engine 14 coupled to a rotating mower blade 16 positioned beneath a mower deck 18 for cutting grass within a horizontal plane. A trimmer means 20 is mounted to the mower deck 18 and mechanically coupled to the engine 14 for trimming grass adjacent to a solid object. An edger means 22 is also mounted relative to the mower deck 18 so as to project laterally thereof and mechanically communicates with the engine 14 to rotate an edger blade 24 within a vertical plane for cutting grass adjacent to a solid object. By this structure, the edging and trimming lawn mower assembly 10 can be easily utilized to effect cutting of grass, trimming of such grass proximal to solid objects, and edging of such grass adjacent to solid objects.

Figure 2:
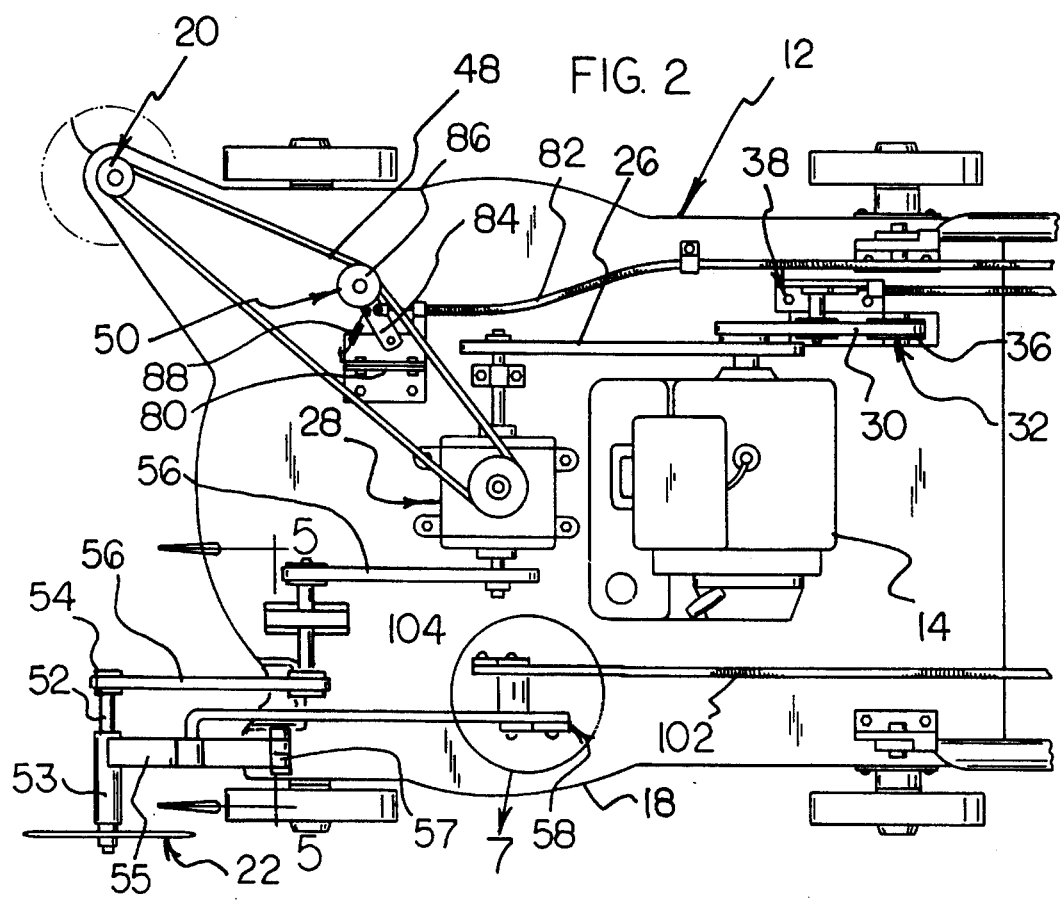
FIG. 2 is an enlarged top plan view of the invention.

As shown in FIGS. 1 and 2, the engine 14 includes an unlabeled engine shaft projecting therefrom. A transmission belt 26 extends over an engine pulley coupled to the engine shaft to transfer torque to a distribution transmission 28 mounted to the mower deck 18. The distribution transmission 28 is mechanically coupled to the trimmer means 20 and the edger means 22 so as to provide a source of rotational torque therefor. Further, a propulsion belt 30 communicates with the engine pulley coupled to the engine shaft of the engine 14 to provide a source of rotational torque to a drive means 32 to propel the mower deck 18 across a horizontal supporting surface. To this end, the drive means 32 preferably comprises an unlabeled axle supporting a plurality of wheels 34, with an axle pulley 36 being coupled to the axle and receiving torque from the engine pulley thorough the propulsion belt 30. A drive clutch means 38 is provided for selectively tensioning the propulsion belt 30 to allow mechanical communication between the engine pulley and the axle pulley 36 through the propulsion belt 30. By this structure, the drive clutch means 38 can be selectively operated by an individual to effect propulsion of the mower 10 forward across a ground surface under power generated by engine 14.

Figure 6:
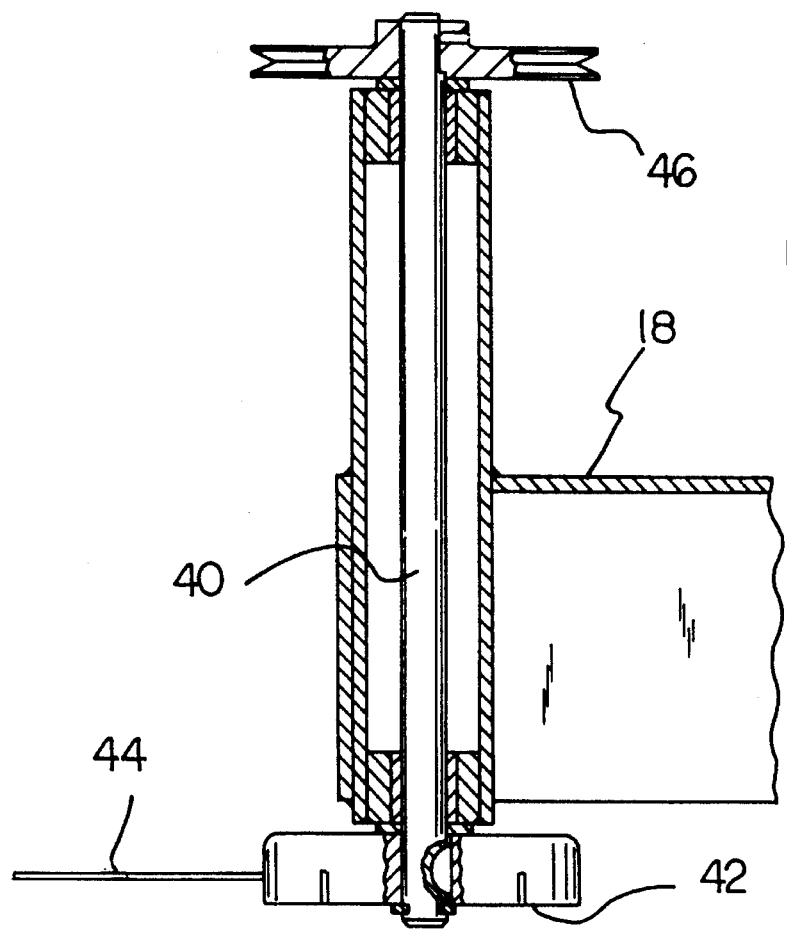
FIG. 6 is a cross sectional view taken along line 6—6 of FIG. 1.

As best illustrated in FIGS. 2 and 6, it can be shown that the trimmer means 20 according to the present invention 10 comprises a trimmer shaft 40 rotatably supported relative to the mower deck 18 proximal to a lateral edge thereof. A hub 42 mounted to a lower end of the trimmer shaft 40 supports monofilament line 44 such that rotation of the hub 42 will rotate the monofilament line 44 within a horizontal plane to effect cutting of grass adjacent to a solid object. A trimmer receiving pulley 46 is mounted to an upper end of the trimmer shaft 40 and receives torque from the distribution transmission 28 through a trimmer belt 48 extending therebetween. As shown in FIG. 2, a trimmer clutch means 50 is mounted to the mower deck 18 for selectively tensioning the trimmer belt 48 to permit mechanical communication and transfer of torque between the trimmer means 20 and the distribution transmission 28. By this structure, the trimmer clutch means 50 can be selectively operated to cause rotation of the monofilament line 44 of the trimmer means 20.

Figure 5:
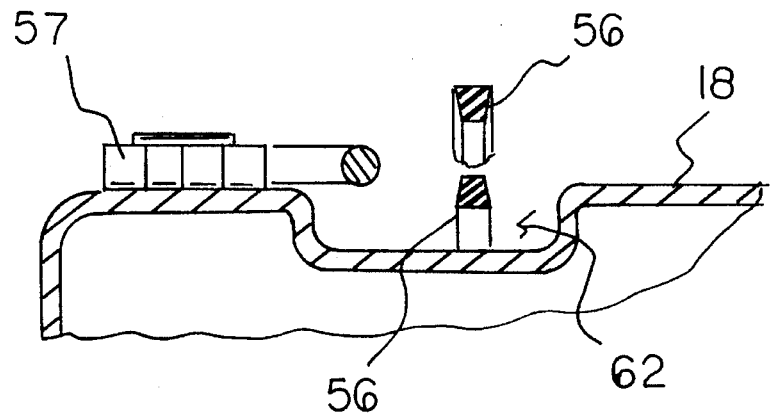
FIG. 5 is a cross sectional view taken along line 5—5 of FIG. 2.

As best illustrated in FIGS. 2 and 5, it can be shown that the edger means 22 according to the present invention 10 preferably comprises an edger shaft 52 rotatably and pivotally mounted relative to the mower deck 18 and projecting laterally thereof. To this end, the edger shaft is rotatably received within a shaft receiver 53, with an edger supporting arm 55 being pivotally mounted to the deck 18 by a hinge 57 interposed therebetween. The edger blade 24 is mounted to an outer distal end of the edger shaft 52 and rotates within a vertical plane to effect cutting of grass proximal to a solid object such as the edge of a driveway or sidewalk. An edger receiving pulley 54 is mounted to an interior end of the edger shaft 52 and receives rotational torque from the distribution transmission 28 through a pair of edger belts 56 mechanically coupled together and extending between the distribution transmission and the edger receiving pulley 54. An edger adjustment means 58 is mounted to the mower deck 18 for selectively effecting pivoting of the edger supporting arm 55 relative to the mower deck 18, preferably within an arc having a constant radius of curvature and centered at a juncture of the pair of edger belts 56. The edger adjustment means thus permits vertical adjustment of the edger means 22 relative to the deck 18 of the mower means 12. By this structure, the edger blade 24 can be operated so as to rotate within a vertical plane to cut grass adjacent to a solid object.

Figure 7:
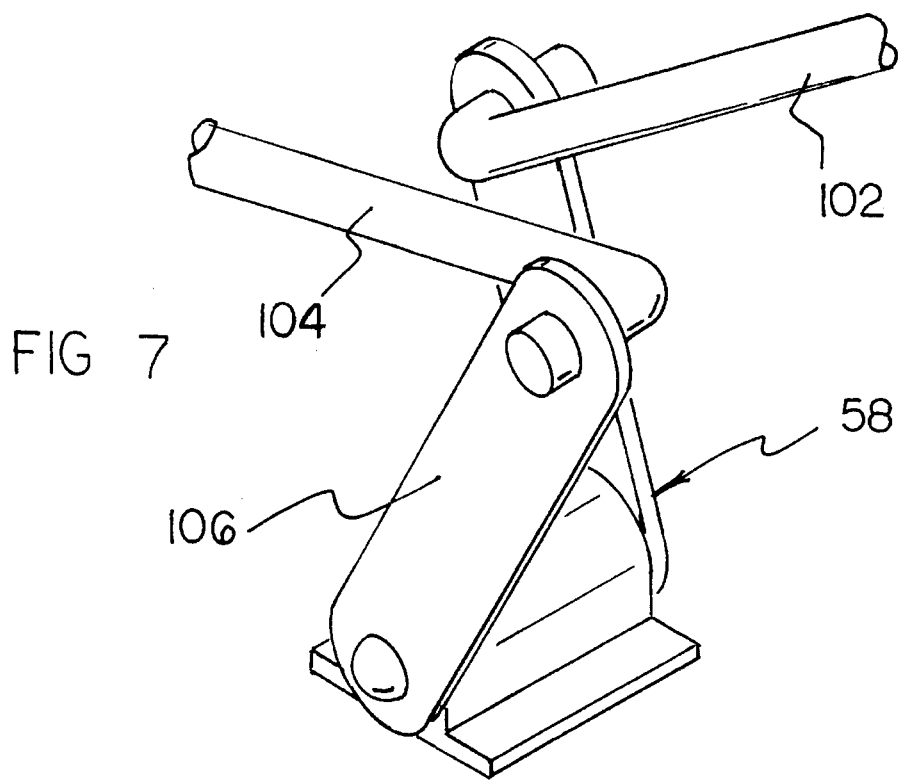
FIG. 7 is an isometric illustration of a the area set forth in FIG. 2.
Figure 8:
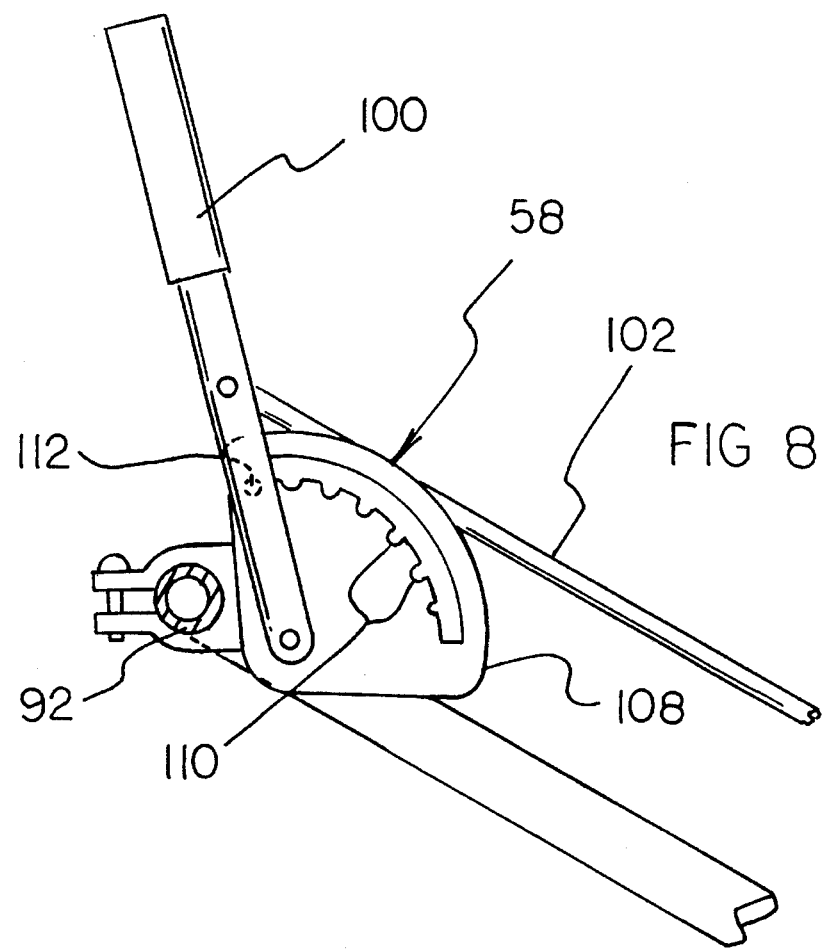
FIG. 8 is a side elevational view taken from line 8—8 of FIG. 1.

Referring to FIGS. 7 and 8, it can be shown that the edger adjustment means 58 further comprises an adjustment handle 100 which is pivotally mounted relative to a handle of the mower means 12. A first control rod 102 extends from the adjustment handle 100 and is coupled to a second control rod 104 by an angled coupler 106 interposed therebetween. The second control rod 102, as shown in FIG. 2, is coupled to the edger supporting arm 55 so as to effect controlled pivoting thereof in response to a movement of the adjustment handle 100. To secure a desired position of the edger supporting arm 55, the adjustment means 58 further comprises a securing plate 108 having an arcuate array of detent apertures 110 directed thereinto. A detent projection 112 extending from the adjustment handle 100 can be selectively positioned into one of the detent apertures so as to secure the adjustment handle at a desired angular orientation. By this structure, the edger means 22 can be selectively adjusted and held at a desired vertical height relative to the mower deck 18.

As shown in FIG. 5, the mower deck 18 is preferably shaped so as to define a recessed portion 60 creating a belt cavity 62 within which the edger belt 56 is positioned so as to permit the edger shaft 52 to be mounted proximal to the supporting surface upon which the device 10 resides and still provide clearance for one of the edger belts 56 extending between the distribution transmission 28 and the edger receiving pulley 54.

Figure 3:
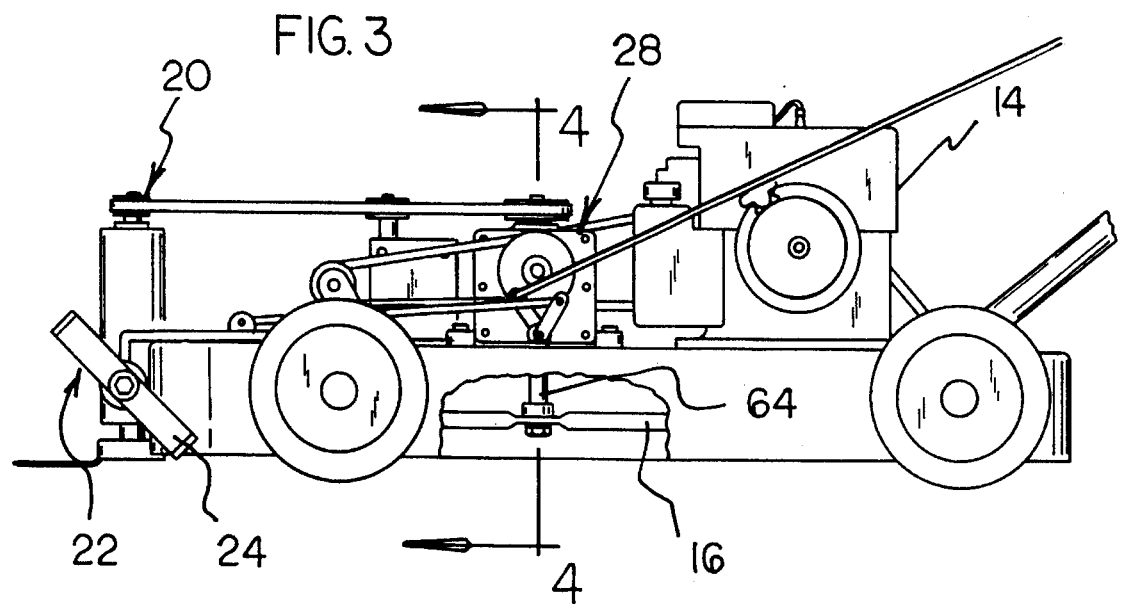
Fig. 3 is a side elevation view, partially in cross section, of the invention.
Figure 4:
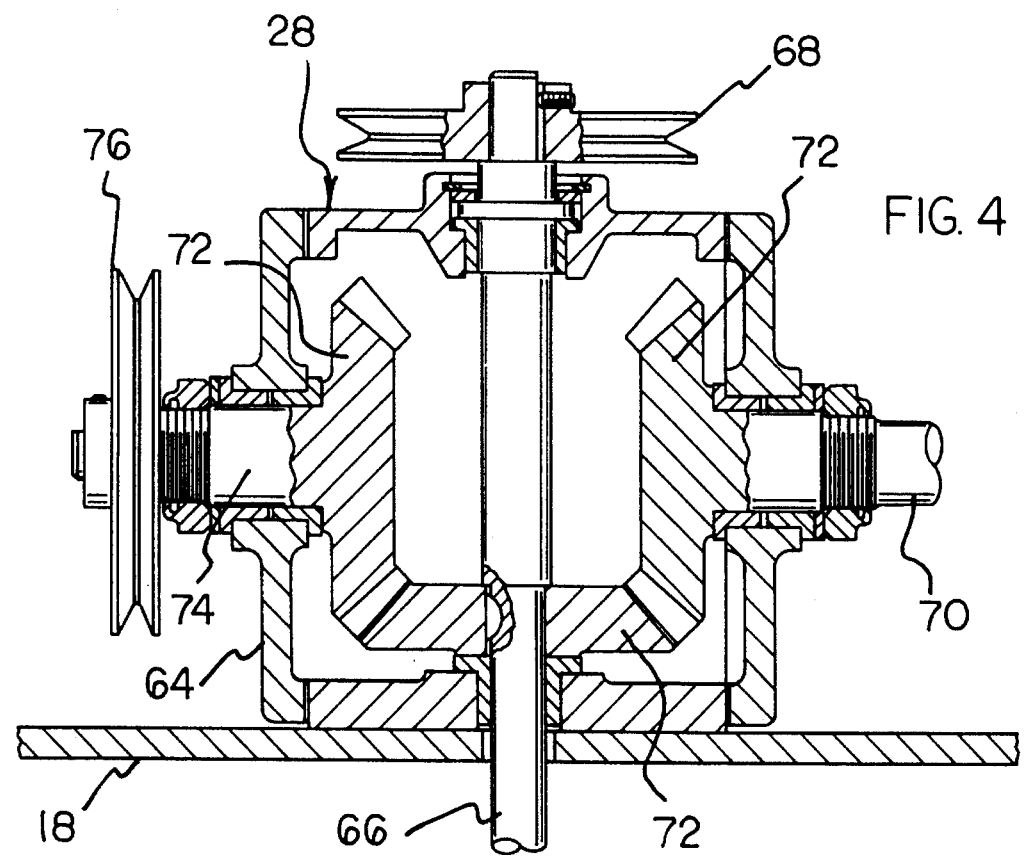
FIG. 4 is a cross sectional view taken along line 4—4 of FIG. 3.

Referring now to FIG. 4, it can be shown that the distribution transmission 28 according to the present invention 10 preferably comprises a transmission housing 64 mounted to the mower deck 18. A center shaft 66 is rotatably supported by and projects through the transmission housing 64. The mower blade 16 is coupled to a lower distal end of the center shaft 64, as shown in FIG. 3, so as to rotate the mower blade during operation of the device 10. The center shaft 66 projects above the transmission housing 64 and terminates in a trimmer transmitting pulley 68 over which the trimmer belt 48 extends. An input shaft 70 projects into the transmission housing 64 and is rotatably supported thereby. The input shaft 70 receives torque from the engine 14 through the transmission belt 26 by an unlabeled pulley and transfers such received torque to a series of bevel gears 72 mounted within the transmission housing 64. The bevel gears 72 provide mechanical communication between the input shaft 70 and the center shaft 66 such that a rotation of the input shaft 70 will result in a rotation of center shaft 66 proportionally therewith. An output shaft 74 is rotatably mounted to the transmission housing 64 and receives torque from one of the bevel gears 72 for transmission through an edger transmitting pulley 76 to the edger belt 56 to operate the edger means 22 as described above. By this structure, the engine 14 rotates the input shaft 70 to distribute torque to both the center shaft 66 causing rotation of the mower blade 16 and the trimmer transmitting pulley 68, as well as to the output shaft 74 causing rotation of the edger transmitting pulley 76.

As shown in FIG. 2, the clutch means 38 and 50 are substantially similar in design and configuration such that a single design of the clutch means can be adapted for use with the drive means 32, the trimmer means 20 or the edger means 22. To this end, the clutch means 38 and 50 each comprise a mounting bracket 80 having a cable 82 extending therefrom. A clutch lever 84 is pivotally mounted to the mounting bracket 80 and rotatably supports a clutch pulley 86 engagable to the respective belt 30 and 48. A return spring 88 biases the clutch pulley 86 into a first direction, with the cable 82 being manually tensionable to effect engagement of the clutch pulley against a force of the return spring 88 and into contact with the respective belt. By this structure, a tensioning of the cable 82 can be manually accomplished to effect tensioning of the respective belt 30 and 48 to cause operation of the respective of drive means 32 or trimmer means as desired.

Referring now to FIG. 1, it can be shown that the mower means 12 may further comprise a handle 92 to which a control lever 94 is pivotally mounted. The control cable 82 of each of the clutch means 38 and 50 extends into communication with the control lever such that a rotation thereof will tension the cable to effect engagement of the clutch pulley 86 with the respective belt 30 or 48 to tension the same and cause operation of the respective drive means 32, trimmer means 20, or edger means 22 as desired.

In use, the edging and trimming lawn mower assembly 10 according to the present invention can be easily utilized to effect cutting, trimming, and edging of a lawn. The device incorporates all the features enumerated above within a compact package driven by a single engine 14 which can be easily stored and maintained during periods of non-use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A edging and trimming lawn mower assembly comprising: a mower means having an engine coupled to a rotating mower blade positioned beneath an mower deck for cutting grass within a horizontal plane; a trimmer means mounted to one side of the mower deck and being mechanically coupled to the engine for trimming grass adjacent to a solid object; an edger means mounted to a second side of the mower deck so as to project laterally thereof and mechanically communicating with the engine for cutting grass within a vertical plane adjacent to a solid object, wherein the engine includes an engine shaft projecting therefrom; and further comprising a distribution transmission in mechanical communication with the engine, the distribution transmission being mounted to the mower deck and mechanically coupled to the trimmer means and the edger means.

2. The edging and trimming lawn mower assembly of claim 1, and further comprising a means for propelling the mower means across a supporting surface.

3. The edging and trimming lawn mower assembly of claim 1, wherein the trimmer means comprises a trimmer shaft rotatably supported relative to the mower deck proximal to a lateral edge thereof; a hub mounted to a lower end of the trimmer shaft; a monofilament line projecting from the hub; a trimmer receiving pulley mounted to an upper end of the trimmer shaft; a trimmer belt extending between the trimmer receiving pulley and the distribution transmission; and a trimmer clutch means mounted to the mower deck for selectively tensioning the trimmer belt to permit mechanical communication and transfer of torque between the trimmer means and the distribution transmission.

4. The edging and trimming lawn mower assembly of claim 5, wherein the edger means comprises an edger shaft rotatably mounted relative to the mower deck and projecting laterally thereof; an edger blade mounted to an outer distal end of the edger shaft for rotating within a vertical plane to effect cutting of grass proximal to a solid object; an edger receiving pulley mounted to an interior end of the edger shaft; and at least one edger belt extending between the edger receiving pulley and the distribution transmission.

5. The edging and trimming lawn mower assembly of claim 4, wherein the distribution transmission comprises a transmission housing mounted to the mower deck, a center shaft rotatably supported by and projecting through the transmission housing, the mower blade being coupled to a lower distal end of the center shaft so as to rotate beneath the deck, the center shaft projecting above the transmission housing; a trimmer transmitting pulley mounted to an upper end of the center shaft, the trimmer belt extending over the trimmer transmitting pulley; an input shaft projecting into the transmission housing being rotatably supported thereby, the input shaft being mechanically coupled to the engine, the input shaft being in mechanical communication with the center shaft; an output shaft rotatably mounted to the transmission housing and receiving torque from the center shaft; and an edger transmitting pulley mounted to the output shaft, with the at least one edger belt extending over the edger transmitting pulley.

6. The edging and trimming lawn mower assembly of claim 5, wherein the clutch means each comprise a mounting bracket having a cable extending therefrom; a clutch lever pivotally mounted to the vertical mounting bracket; a clutch pulley rotatably mounted to the clutch lever, the clutch pulley being engagable to one of the belts; and a return spring biasing the clutch pulley into a first direction, with the cable being manually tensionable to effect engagement of the clutch pulley against a force of the return spring and into contact with the respective belt to tension the same.

7. The edging and trimming lawn mower assembly of claim 6, and further comprising edger adjustment means for effecting positioning of the edger means relative to the mower deck of the mower means.

* * * * *